March 18, 1969  H. E. ERIKSON  3,433,950
PHOTOGRAPHIC PRODUCTS AND PROCESSES
Filed July 8, 1963

INVENTOR.
Herman E. Erikson
BY Brown and Mikulka
and Alvin Isaacs
ATTORNEYS

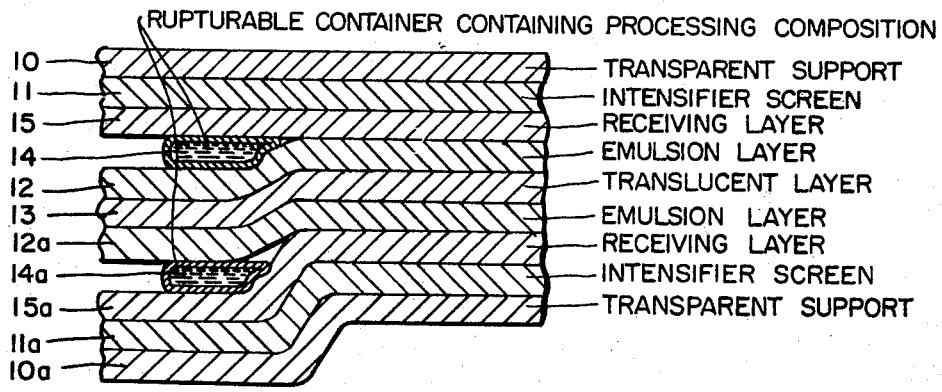
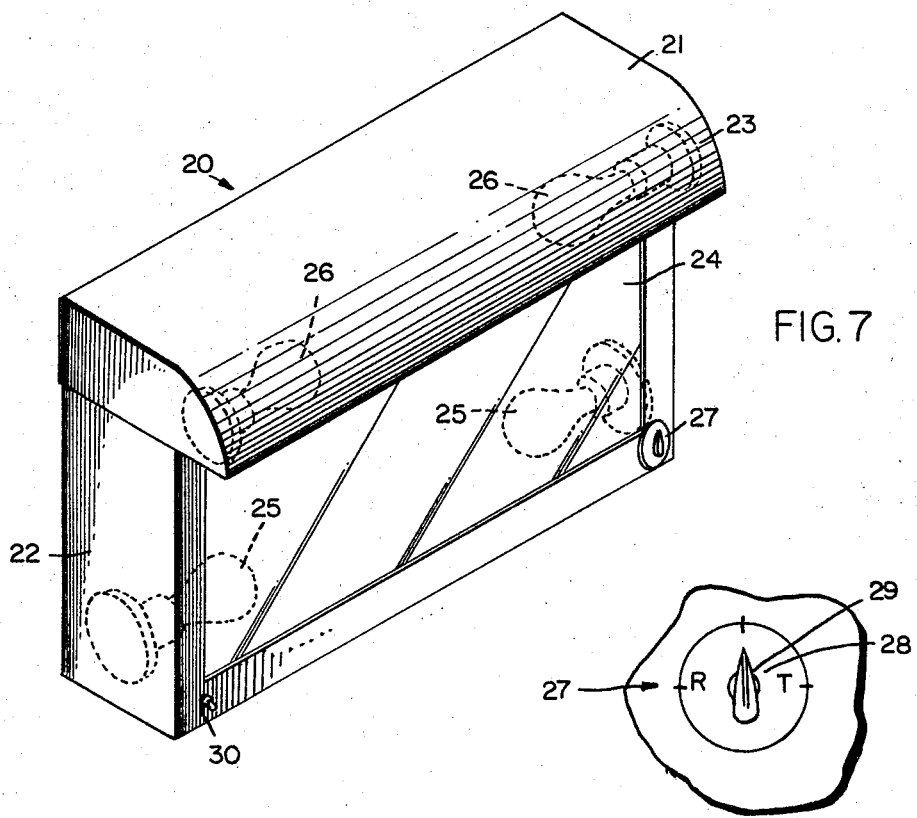

3,433,950
PHOTOGRAPHIC PRODUCTS AND PROCESSES
Herman E. Erikson, Winchester, Mass., assignor to Polaroid Corporation, Cambridge, Mass., a corporation of Delaware
Filed July 8, 1963, Ser. No. 293,412
U.S. Cl. 250—65      5 Claims
Int. Cl. H01j 37/22; G03c 5/00; G01n 23/04

ABSTRACT OF THE DISCLOSURE

Procedures for preparing radiographs viewable by both transmitted and reflected light, utilizing a photographic product including a pair of photosensitive elements having a translucent material positioned therebetween.

---

This invention relates to radiography and more particularly to novel products and processes for preparing radiographs.

One object of this invention is to provide a novel film unit capable of being used in radiographic processes to prepare a negative radiograph which may be viewed either as a transparency or as a reflection print.

Another object is to provide a novel film unit capable of being used in diffusion transfer processes to prepare one or two positive radiographs as well as a negative radiograph of full density, at least one of said radiographs being viewable either as a transparency or as a reflection print.

A further object is to provide a novel film unit which permits greater latitude in exposure in order to obtain a radiograph affording the optimum contrast and information to the viewer.

Yet another object is to provide a radiograph which may be viewed either as a transparency or as a reflection print.

Still another object is to provide novel photographic processes for preparing radiographs which may be viewed either as a transparency or as a reflection print.

A further object is to provide novel diffusion transfer processes for preparing one or two positive radiographs and a full density negative radiographs, at least one of said radiographs being viewable either as a reflection print or as a transparency.

A still further object is to provide a novel viewing method.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a similar view of still another embodiment of the invention;

FIG. 7 is a perspective view of a device useful in viewing radiographs prepared in accordance with this invention; and FIG. 8 is an enlarged view of a portion of the viewing device of FIG. 7.

Figure 1:
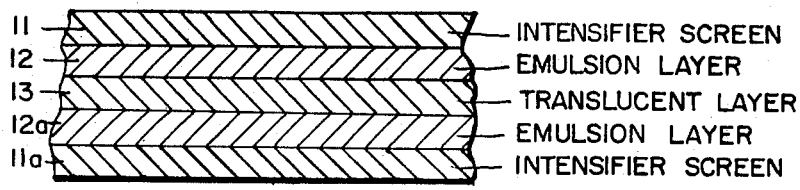
FIGURE 1 is a diagrammatic, enlarged, cross-sectional view illustrating one embodiment of the invention.

Generally speaking, photographic images, including radiographs may be classified as being either reflection prints or transparencies. Reflection prints ordinarily have a substantially opaque backing and are viewed by reflected or incident light; whereas transparencies have a substantially transparent backing and are viewed by transmitted light, e.g., by light passing through the transparent or non-image areas of the print. Each of the foregoing types of photographic images affords advantages to the viewer not ordinarily obtainable by the other. For example, generally speaking, reflection prints are more convenient since they do not require special sources of light and/or positioning of the print in front of a suitable light source (as would be true of transparencies). Transparencies, on the other hand, generally afford greater detail to the viewer due to greater brilliance and longer scale obtainable when viewing by transmitted light.

In the field of radiography, a reflection print has obvious utility since it permits the radiologist or other practitioners to obtain most, if not all, of the desired information at a glance, without having to resort to the special viewing equipment normally required to view transparencies. However, many practitioners, desiring more detailed observation of the radiograph, prefer transparencies which may be placed against a viewing device and viewed by light transmitted from a strong source of light contained therein. Moreover, it has been found that certain information obtainable from a radiograph is more readily visible when viewed as a transparency, whereas other information obtainable from the same radiograph may be more readily visible when viewed as a reflection print.

From the foregoing brief discussion, it should be apparent that it would be extremely desirable in the field of medicine, as well as in other fields where radiographs are employed, to obtain a radiograph which is neither a reflection print alone nor a transparency alone, but may be viewed either as a reflection print or as a transparency, thereby combining the advantages of both in a single radiograph.

This objective is accomplished by a modification of the invention described and claimed in copending application Ser. No. 113,275 filed May 29, 1961, in the name of Edwin H. Land, now U.S. Patent No. 3,185,841. This copending application teaches the novel concept of providing an intensifier screen as an integral part of the image-receiving element. Prior to this invention, it was of course well known in the art of radiography to employ intensifier screens for the primary purposes of reducing the amount of exposure to X-ray or other radioactive waves necessary to form a radiographic image. Use of such screens also gives a more desirable, i.e., longer contrast range curve. Where the intensifier screen is an integral part of the photographic product, as disclosed in the aforementioned copending application, several advantages may be obtained as distinguished from prior practices where the intensifier screen is not an integral part of the image-receiving element but is either destroyed subsequent to exposure or employed in preparing subsequent radiographs. Where the intensifier screen is an integral part of the image-receiving element, it acts as a "built-in" diffusing device which when excited by the viewing light emits visible light, thereby providing greater brilliance and contrast than would be ordinarily obtainable. Moreover, such a film structure makes it possible to obtain a sharper image due to the fact that the intensifier screen is uniformly optically closer to the initial layer than in prior art processes, thereby minimizing distortion in the radiograph.

As was indicated previously, the present invention is a modification of the teachings of the aforementioned copending application. The invention will be more readily understood by reference to the illustrative drawings.

As shown in FIGURE 1, a film unit is provided comprising a pair of intensifier screens 11 and 11a, a pair of photo sensitive emulsions, 12 and 12a, e.g., a pair of strata containing a light-sensitive silver halide emulsion, and a layer of a translucent material 13 separating and contiguous with the two photosensitive emulsions. (If necessary or desirable to give further support to the filament, a transparent support may be associated with the translucent layer.) In other words, the film unit comprises a pair of photosensitive emulsions separated by a layer of a translucent material, each of said emulsions having an intensifier screen associated therewith.

Intensifier screens 11 and 11a, which also may be the same or different and which may be of the same or varying activity, e.g., emit visible light of the same or different intensity when contacted by a given dosage of radiation, may also be any of the intensifier screens heretofore known in the art and may comprise for example a layer of barium sulfate/lead sulfate, mixed phosphor dispersed in a chlorosulfonate polyethylene prepared in the manner described in U.S. Patent No. 2,877,379.

Photosensitive emulsions 12 and 12a, which may also be the same or different and may vary as to sensitivity, etc., may be any suitable photosensitive emulsions such as the silver halide emulsions described in U.S. Patents Nos. 2,565,378 and 2,887,379. Obviously, other light-sensitive materials may be employed and the invention therefore is not limited to systems utilizing silver halide as the light-sensitive material.

The translucent material in layer 13 may comprise a suitable pigment such as finely divided titanium dioxide, calcium carbonate, magnesium oxide, barium sulfate, etc.

It will be apparent that, in this and certain other embodiments described hereinafter, the translucent layer should preferably be impermeable to the processing solution.

The film unit may be exposed in conventional manner, e.g., one of the two intensifier screens is selectively exposed to a suitable dosage of X-ray or other penetrating ionizing radiation. For example, screen 11 is exposed to a suitable dosage of X-rays, causing it to emit visible light to expose stratum 12 containing the photosensitive emulsion, all in a manner heretofore known in the art.

The essence of the invention in the embodiment illustrated in FIGURE 1 is the provision of the layer of translucent material 13.

Some of the X-rays or light emitted by screen 11 do not contact any of the grains of light-sensitive material in emulsion 12 and pass through to impinge upon the layer of translucent material, where a portion of this actinic radiation is reflected back to provide a second or re-exposure of emulsion 12. This additional exposure increases the intensity of the latent image formed thereon. A substantial portion of the total X-rays coninues through to expose emulsion 12a and to strike screen 11a. Since phosphorescent or visible light from an intensifier screen is emitted in all directions, this light in turn further exposes 12a to increase the intensity of the developable or latent image thereof.

It will be apparent from the foregoing description that two exposed negatives are provided, each containing a latent image of the same subject matter. Assuming that both emulsions are of the same speed or degree of sensitivity to actinic radiation, when both emulsions are developed, emulsion 12 will contain a negative image of greater density than will emulsion 12a, although both images are of a usable density. The two combined give a double negative having a $D_{max}$ greater than the $D_{max}$ of either image alone.

While so-called double negative images are well known in the field of radiography, the provision of a layer of translucent material between the two emulsions affords certain advantages not heretofore obtainable in the art.

In the exposure step, the translucent material, as heretofore noted, causes reflection to re-expose one of the emulsions. This double exposure causes the first emulsion to be more exposed than in systems not utilizing the translucent material, and this added exposure in turn causes a greater variation in the difference of exposure between the two emulsions. This greater variation permits a greater latitude in exposure to provide a composite image affording the maximum contrast or information available to the viewer. In prior systems, where the two images are nearly equal, an overexposure or underexposure reduces the amount of information obtainable, since both images will either be overexposed, or underexposed, as the case may be. In the film unit of FIGURE 1, a reasonable underexposure (based upon the recommended exposure for the particular negatives employed) will result in a more fully exposed first emulsion, while a reasonable over-exposure will result in a properly exposed second negative. It will therefore be appreciated that the invention permits a greater margin of error in the amount of exposure permissible to obtain a satisfactory image. In addition, it may also be possible, due to the re-exposure by reflection from the translucent layer, to obtain a more efficient utilization of the energy employed to expose the two negatives, thereby requiring less exposure to X-rays or other radiation to provide an image of full density.

In addition to the advantages heretofore noted pertaining to the exposure of the novel film units of this invention, because of the presence of the layer of the translucent material, the negative radiographs prepared by the present invention may be viewed by either reflected light or transmitted light or by a combination of both. In other words, because of the opacity and the ability to reflect light, the translucent material permits the radiograph to be viewed as a reflection print. On the other hand, sufficient light is transmitted through the translucent material when transilluminated to permit the radiograph to be viewed as a transparency.

The present invention therefore provides a radiograph of excellent density and contrast, regardless of the method of viewing, affording to the practitioner a radiograph which is both a reflection print and a transparency, thereby combining the advantages of both types of photographic images into a single radiograph.

The film unit of FIGURE 1 may be developed by standard developing techniques such as conventional wet processing developing and fixing operations.

However, in a preferred embodiment (FIG. 2), use is made of a pair of frangible containers 14 and 14a containing a processing composition for developing and fixing the exposed negative. Containers 14 and 14a may be any of the frangible containers heretofore known for such purposes, such as the containers disclosed in U.S. Patent No. 2,543,181, issued to Edwin H. Land. The processing composition in containers 14 and 14a may be any of the processing compositions for developing and fixing a negative heretofore known in the art, e.g., a processing composition such as disclosed in Example 1 of U.S. Patent No. 2,544,268 issued to Edwin H. Land. Development may be effected in known manner by rupturing the container, e.g., by passing the film unit between a pair of pressure rollers, and spreading of its contents in a substantially uniform layer between the screen and the exposed emulsion. Where the processing composition does not permit formation of a stable negative, washing and other desired aftertreatment may be performed in known manner.

Figure 2:
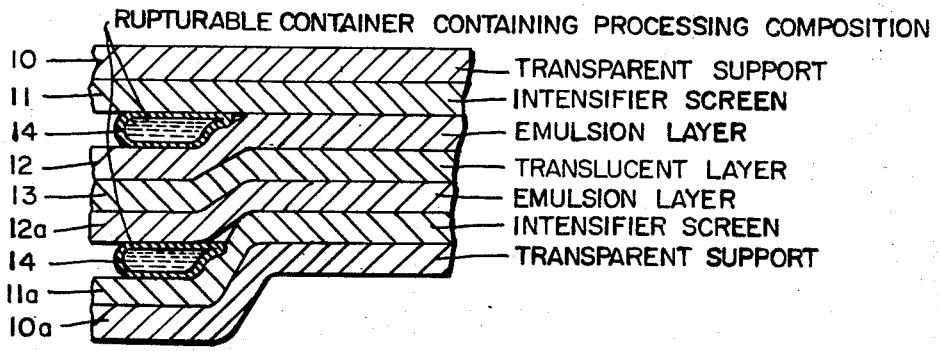
FIG. 2 is a similar view of another embodiment of the invention.

In the embodiment of FIG. 2, a pair of outer transparent base materials 10 and 10a are also provided. These transparent bases, which may be the same or different, may be any of the transparent bases or support materials heretofore employed in the art for such purposes and may, for example, be a base such as a cellulosic ester, e.g., cellulose acetate, a synthetic super polymer of the nylon type, etc.

The present invention also contemplates the preparation of one or two positive radiographs.

Figure 3:
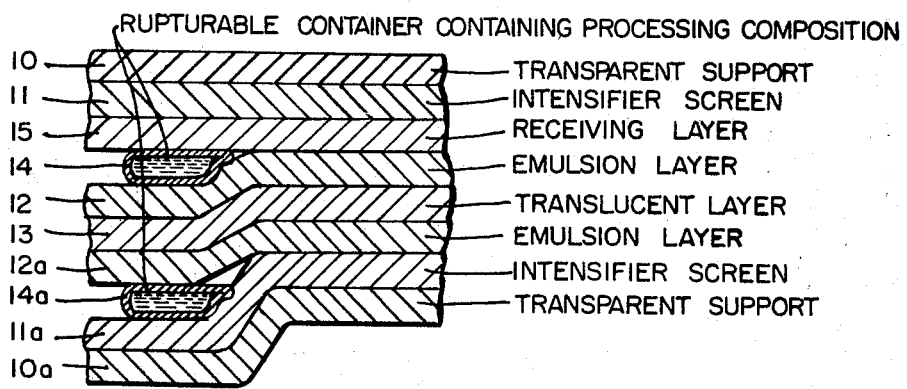
FIG. 3 is a similar view of yet another embodiment of the invention.

In the embodiment illustrated by FIG. 3, a receiving layer 15 is provided in superposed relationship with emulsion layer or stratum 12. (It will be appreciated that the receiving layer may instead be placed in superposed relationship with emulsion layer or stratum 12a). In systems utilizing a silver halide emulsion as the light-sensitive material, receiving layer 15 preferably comprises a silver-receptive stratum containing at least one silver precipitating agent. As examples of suitable silver precipitating agents and of image-receiving layers containing the same, reference may be had to U.S. Patents Nos. 2,698,237, 2,690,238, 2,698,245 and 2,823,122 issued to Edwin H. Land; and U.S. Patent No. 2,774,667 issued to Edwin H. Land and Meroe M. Morse. In a preferred embodiment layer 15 comprises an image-receiving layer containing deacetylated chitin, which is described and claimed in the copending U.S. application of William H. Ryan et al., Ser. No. 808,123 filed Apr. 22, 1959, now Patent No. 3,087,815.

The processing composition in container 14a comprises a composition for developing and fixing the negative, as heretofore noted. However, the processing composition in container 14 comprises a composition for forming a transfer image, e.g., an aqueous alkaline solution of a silver halide developing agent and a silver halide solvent. A viscous film-forming reagent, such as sodium carboxymethyl cellulose, hydroxyethyl cellulose, etc., is preferably also present. Processing compositions of this nature are disclosed in the aforementioned patents.

In this embodiment, the film unit is exposed and development initiated in the manner heretofore noted. While a usable negative image is formed by developing emulsion 12a, a positive image is obtained by diffusion transfer on receiving layer 15 in known manner. That is, in systems for preparing a silver transfer image from an exposed silver halide emulsion, the exposed silver halide is reduced to silver, while a soluble silver complex formed from the unexposed silver halide is transferred, by imbibition, to layer 15 where it is precipitated as a positive silver image. This image may then be separated from emulsion 12 to provide a positive radiograph comprising base 10, screen 11 and layer 15 containing the silver image. A positive radiograph of this nature having an intensifier screen as an integral part thereof has the advantages heretofore noted and described in the aforementioned copending application of Edwin H. Land, Serial No. 113,275, now U.S. Patent No. 3,185,841.

Preferably, container 14a contains a processing solution such as described and claimed in copending application Ser. No. 94,451 filed Mar. 9, 1961, now Patent No. 3,345,166 in the names of Edwin H. Land, Meroe M. Morse and Elizabeth L. Yankowski, in order to provide a fully developed and fixed and hence usable negative concurrently with the formation of a positive silver transfer image also of fully density. By separation of the positive image, there is provided, in addition to the positive silver image, a double negative image which, without further separation, may be viewed as either a reflection print or as a transparency.

In the embodiment illustrated in FIG. 4, a second image-receiving layer 15a is provided, in order to obtain two positive images, each containing an intensifier screen as an integral part thereof. It will be appreciated that in this embodiment both containers contain a processing composition for forming a transfer image. Either or both of the processing compositions may be of the nature disclosed in the aforementioned copending application Ser. No. 94,451 in order to provide one or two fully developed and fixed negatives along with the two positive images. In this manner, it is possible to obtain two positive images along with a double negative image, the latter having the properties heretofore noted which permit viewing as either a reflection print or as a transparency.

In a modification of this latter embodiment, supports 10 and/or 10a may be opaque to visible light but transparent to the penetrating ionizing radiation employed to expose the film unit. Alternatively, an opaque pigment or the like may be provided. In this manner, a positive reflection print is provided rather than a positive transparency. It is also contemplated that, if desirable or expedient to do so, a suitable support may be associated with translucent layer 12 to support the double negative image. The concept of providing a support for the superposed double image is described in more detail in the following description of the embodiment shown in FIG. 5.

In the embodiments of the invention heretofore described, a negative radiograph is obtained which may be viewed as either a reflection print or as a transparency. By a rearrangement of the elements in the embodiment illustrated in FIG. 5, a positive radiograph is obtained which may be viewed as either a reflection print or as a transparency.

As shown therein, the relationship of the emulsion layer and the receiving layer to the associated intensifier screen has been reversed (cf. FIG. 4). In other words, rather than the intensifier screen being contiguous with the receiving layer, in this embodiment the intensifier screen is contiguous with the emulsion layer.

In addition, a translucent support 16 is provided between the two receiving layers. As examples of translucent supports, mention may be made of pigmented polystyrene or diacetate, etc. It will be appreciated, of course, that in lieu of a translucent support, a transparent support such as supports 10 or 10a may be provided, having a layer of a translucent material such as layer 12 on either side or both sides thereof.

Figure 5:
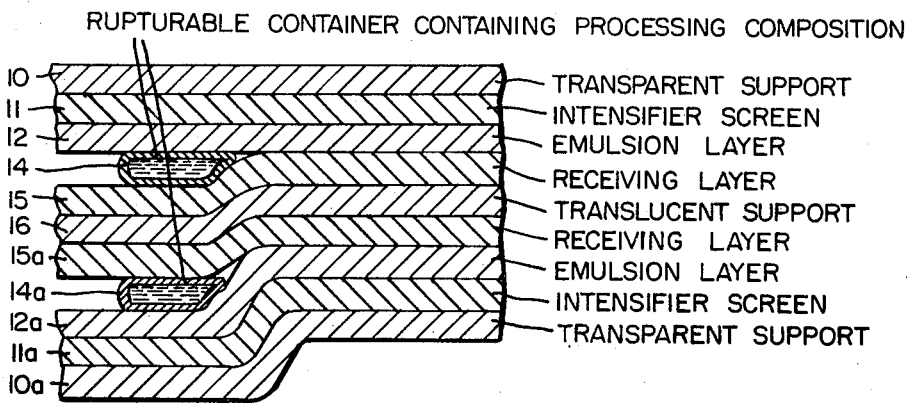
FIG. 5 is a similar view of a further embodiment of the invention.

The film unit of FIG. 5 is exposed and developed in the foregoing manner. However, when the two emulsion layers are stripped from the respective superposed receiving layers, a positive image is revealed on each of the receiving layers with a translucent support therebetween. This positive image, like the negative images heretofore described, may be viewed by either reflected or transmitted light.

Where a processing solution is employed which provides a usable negative, e.g., a processing solution such as described in the aforementioned copending application, Ser. No. 94,451, a pair of usable negative images may also be obtained, each having an intensifier screen positioned therebehind.

In a modification of this latter embodiment, supports 10 and/or 10a are opaque to visible light, but transparent to and hence transmit the X-ray or other penetrating ionizing radiation employed to expose the film unit. Alternatively, an opaque pigment or the like may be provided. In this manner, a negative reflection print is provided rather than a negative transparency.

In still another modification of the embodiments illustrated in FIGS. 3–5 the layer containing the intensifier screen may also contain a translucent material. The latter may be a separate material dispersed substantially uniformly throughout the layer containing the intensifier screen, or the intensifier screen material itself may be translucent. As an example of translucent intensifier screens, mention may be made of what is known in the art as a "P-4 phosphor screen," i.e., a screen made of a mixture of silver-activated zinc sulfide and silver-activated zinc cadmium sulfide. Alternatively, the translucent material may be provided in a second layer contiguous with the intensifier screen.

It will be apparent that in the last-mentioned modification, it is possible to obtain both positive and negative radiographs which may be viewed by either reflected or transmited light. For example, in the embodiment shown in FIG. 5, in addition to the positive radiograph, it is possible to obtain two negative radiographs which may also be viewed by transmitted or reflected light.

In still another variation of this invention, the transparent support and intensifier screen need not be an integral part of the film assembly, such as is true of the embodiments illustrated in FIGS. 1–5. Rather, use may be made of acassette having a built-in intensifier screen, such as the flexible cassettes described and claimed in copending U.S. application Ser. No. 232,950 filed Oct. 25, 1962, now abandoned in the name of Edwin H. Land. Briefly, the flexible cassettes described in said application comprise a flexible lighttight outer envelope having one or two built-in intensifier screens. In one embodiment, a pair of intensifier screens are mounted internally on the front and back portions of the cassette in face-to-face relationship. The film unit is placed in the cassette and exposed to X-rays or the like in conventional manner. In film units utilizing a rupturable container for the processing composition, development may be effected without removing the exposed film from the cassette, e.g., by passing the cassette containing the exposed film through a pair of pressure rollers to rupture the frangible container. Subsequent to development, the container is opened to reveal the finished radiograph.

Figure 6:
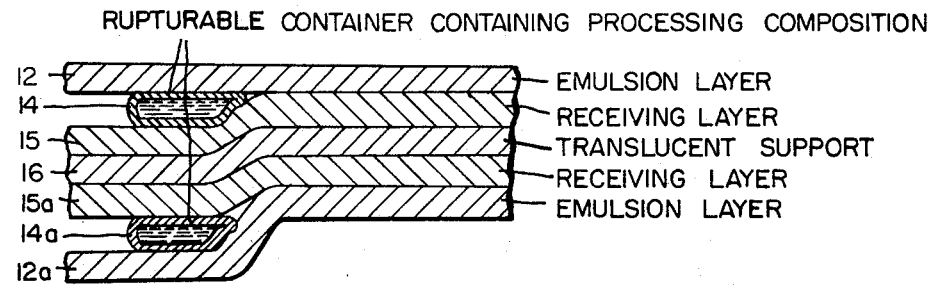
FIG. 6 is a similar view of a still further embodiment of the invention.

FIG. 6 illustrates a film unit which may be employed in cassettes of this nature. It will be noted that the film unit of FIG. 6 is the film unit of FIG. 5 with the intensifier screens and supports therefor removed. Where desired, a support for each of the emulsion layers may be provided to facilitate separation of the emulsion from the receiving layer.

While the radiograph of this invention having a translucent material associated therewith is adaptable to viewing by any source of reflected or transmitted light, a viewing device such as illustrated in FIGS. 2 and 8 has been found to be particularly satisfactory.

As shown in FIG. 7, viewing device 20 has a top 21 and side walls 22 which are preferably opaque and a front surface 24 made of frosted glass or the like which permits transmission of light from a strong source 25 located within, e.g., behind light-transmitting surface 24. A shield 23 extending away from the front of the viewer and having a strong light source 26 mounted thereon in a position adaptable to illuminate the front of the viewer is also provided. The internal surface of shield 23 is preferably mirrored so as to provide a reflecting surface to increase the intensity of light cast upon the front of the viewer. While light sources 25 and 26 are shown each to be a pair of incandescent lights, obviously other light sources and/or numbers of lights may be employed.

Both light sources 25 and 26 are wired by a series of switches (not shown) to a control 27 in such a manner that the intensity of light emitted from lights 25 and/or 26 may be controlled. As shown in FIG. 7, control 27 includes a dial 28 provided with an indicator 29. Suitable marking indicia such as the R, T and intermediate point therebetween shown in FIG. 8 are preferably provided on the face of the control. An on-off switch 30 is also provided.

Since devices of this nature are well known, the foregoing brief description should enable those skilled in the art to understand and practice the following viewing procedure.

The translucent radiograph of this invention is placed against the front surface 24 and the viewing device is turned on by moving switch 30. The desired viewing light is obtained by turning dial 28 in the desired position. When indicator 29 is turned all the way to the left so that it points to the R on the dial, only light source 26 is on and the radiograph is viewed solely by reflected light. As the dial is turned to the right, the intensity of light from source 26 decreases and source 25 is turned on and slowly increases in intensity. In other words, when indicator 29 is turned all the way to the left, source 25 is off and a full intensity of light is emitted from source 26, and when the indicator is then moved to the right, both sources of light are on, the intensity of light from source 26 decreasing and the intensity of light from source 25 increasing as the dial is turned further to the right. At intermediate positions on the dial, it should be apparent that the radiograph may then be viewed by both reflected and transmitted light. At a point equidistant on the dial, e.g., when the indicator points straight up, the intensity of light emitted from the two sources is approximately equal. When the dial is turned all the way to the right, so that the indicator points to the T, a full intensity of light is emitted from source 25 and source 26 is turned off, so that the radiograph is viewed solely as a transparency.

It will be appreciated that various changes may be made in the film structures illustrated in FIGS. 1–6 without departing from the scope of the invention. For example, where the film unit is of sufficient strength, support 10 and/or 10a may be eliminated. It will also be appreciated that the present invention is not restricted to black-and-white radiography. It is within the scope of the invention to employ dyes, color couplers, dye developers and other image-forming materials to provide positive and/or negative color radiographs.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A process for preparing radiographs which comprises the steps of confining between a pair of intensifier screens a radiographic film unit comprising a pair of photosensitive elements having a translucent material positioned therebetween; exposing said film unit through one of said intensifier screens to a source of penetrating ionizing radiation, the visible light emitted by said intensifier screen and a first portion of said radiation exposing one of said photosensitive elements, re-exposing said previously exposed element by reflection from said translucent material, thereby increasing the intensity of exposure thereof, a second portion of said radiation exposing the other of said photosensitive elements, while a third portion of said radiation impinges against the other of said intensifier screens, causing it to emit visible light which further exposes said other photosensitive element; and developing said exposed photosensitive elements to provide a radiograph comprising a pair of superposed images having a translucent material therebetween, said radiograph being viewable by both transmitted and reflected light.

2. A process as defined in claim 1 wherein at least one of said exposed elements is developed by spreading a processing composition between said element and a superposed image-receiving layer to form, by imbibition, at least one positive image.

3. A process as defined in claim 2 wherein each of said exposed elements is developed by spreading a processing composition between each of said elements and a superposed image-receiving layer, to form a pair of developed and fixed negative images on said elements and a pair of positive transfer images on said receiving layers.

4. A process as defined in claim 3 wherein said pair of superposed images having a translucent material therebetween comprises said pair of negative images.

5. A process as defined in claim 3 wherein said pair of superposed images having a translucent material therebetween comprises said pair of positive images.

References Cited

UNITED STATES PATENTS

| | | | |
|---|---|---|---|
| 804,038 | 11/1905 | Pifer | 96—79 |
| 2,371,843 | 3/1945 | Powers | 260—68 |
| 2,565,378 | 8/1951 | Land | 96—76 |
| 3,053,659 | 9/1962 | Land | 96—29 |
| 2,887,379 | 5/1959 | Blake et al. | 96—29 |
| 3,114,833 | 12/1963 | Fine | 96—2 |
| 3,185,841 | 5/1965 | Land | 96—76 |

NORMAN G. TORCHIN, *Primary Examiner.*

J. P. BRAMMER, *Assistant Examiner.*

U.S. Cl. X.R.

96—29, 76; 260—68